United States Patent
Tian

(10) Patent No.: US 9,251,614 B1
(45) Date of Patent: Feb. 2, 2016

(54) BACKGROUND REMOVAL FOR DOCUMENT IMAGES

(71) Applicant: KONICA MINOLTA LABORATORY U.S.A., INC., San Mateo, CA (US)

(72) Inventor: Yibin Tian, Menlo Park, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/473,913

(22) Filed: Aug. 29, 2014

(51) Int. Cl.
| | |
|---|---|
| G06K 9/18 | (2006.01) |
| G06T 11/60 | (2006.01) |
| G06K 9/46 | (2006.01) |
| G06K 9/52 | (2006.01) |

(52) U.S. Cl.
CPC . *G06T 11/60* (2013.01); *G06K 9/18* (2013.01); *G06K 9/46* (2013.01); *G06K 9/4604* (2013.01); *G06K 9/4642* (2013.01); *G06K 9/52* (2013.01); *G06K 2009/4666* (2013.01)

(58) Field of Classification Search
CPC ........ G06T 11/60; G06K 9/46; G06K 9/4642; G06K 9/52; G06K 9/18; G06K 9/4604; G06K 2009/4666
See application file for complete search history.

(56) References Cited

U.S. PATENT DOCUMENTS

| | | | |
|---|---|---|---|
| 6,731,821 B1 | 5/2004 | Maurer et al. | |
| 6,816,618 B1* | 11/2004 | Imaizumi | H04N 1/56 382/166 |
| 7,742,194 B2* | 6/2010 | Fujiwara | H04N 1/40062 358/1.9 |
| 8,126,270 B2* | 2/2012 | Iinuma | G06K 9/00456 382/178 |
| 8,144,986 B2* | 3/2012 | Ma | G06K 9/38 382/169 |
| 8,451,497 B2* | 5/2013 | Kosaka | H04N 1/00822 358/1.9 |
| 2006/0245650 A1* | 11/2006 | Jun | G06K 9/00463 382/176 |
| 2007/0160295 A1* | 7/2007 | Wang | G06K 9/00456 382/199 |
| 2011/0222769 A1* | 9/2011 | Galic | G06K 9/00456 382/173 |
| 2012/0242897 A1* | 9/2012 | Chattopadhyay | G06K 9/325 348/467 |
| 2014/0247470 A1* | 9/2014 | Hunt | H04N 1/00251 358/302 |

OTHER PUBLICATIONS

Leedham et al., "Separating Text and Background in Degraded Document Images—A Comparison of Global Thresholding Techniques for Multi-Stage Thresholding", IEEE, Proceedings of the Eighth International Workshop on Frontiers in Handwriting Recognition (IWFHR'02), 2002.

\* cited by examiner

*Primary Examiner* — Gregory M Desire
(74) *Attorney, Agent, or Firm* — Chen Yoshimura LLP

(57) ABSTRACT

A simple, fast, and effective method is provided for background removal for document images with dark text over relatively uniform or slow-varying non-white background. Candidate regions for background removal are first identified by binarizing the input gray-scale image using a global threshold very close to white. Large contours in the binarized image are identified as candidate regions. A histogram analysis is applied to preliminarily identify regions containing graphics, which are excluded from further processing. The remaining candidate regions are individually binarized. The binarized regions are analyzed to determine whether they contain graphics or text/table, by examining their geometric characteristics and statistics of connected components within them. For candidate regions determined to contain text or tables, background pixels in the input image are set to white using a mask which is the inverse of the individually binarized images of the regions. Regions that contain graphics are left unchanged.

10 Claims, 2 Drawing Sheets

BACKGROUND REMOVAL FOR DOCUMENT IMAGES

BACKGROUND OF THE INVENTION

1. Field of the Invention

This invention relates to document image processing, and in particular, it relates to background removal for document images.

2. Description of Related Art

It is not uncommon that some document images have background for texts. For example, sometimes presentation slides are made with background graphics. Such images can be challenging for many binarization methods, whether they are global or local/adaptive methods. Global binarization methods may produce all white or all black for the regions with background, while local/adaptive binarization methods may introduce artifacts in the transition zones between regions with and without background and in zones where the background image has significant variations. Various sophisticated background removal techniques have been proposed, but they tend to be complex and slow. In addition, some background removal techniques, for example contrast mapping such as that disclosed in U.S. Pat. No. 6,731,821, use a global approach that has impact on foreground texts and graphical (non-text) regions while removing background.

SUMMARY

Accordingly, the present invention is directed to a method and related apparatus for background removal for document images that substantially obviate one or more of the problems due to limitations and disadvantages of the related art.

An object of the present invention is to provide a method that uses relatively simple operations to remove background of document images so that simple binarization methods (either global or local/adaptive) can be applied afterwards to obtain desirable binary image.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for processing an input gray-scale document image for background removal, which includes: (a) binarizing the input gray-scale image using a global threshold value close to a pixel value representing an ideal background to generate a first binarized image; (b) calculating external contours in the first binarized image; (c) identifying large external contours, and designating regions of the input gray-scale image enclosed by large external contours as candidate regions for background removal; (d) for each candidate region of the input gray-scale image, calculating a histogram of numbers of pixels having each pixel value, and based on the histogram, determining whether the candidate region is a region containing graphics; (e) individually binarizing candidate regions of the input gray-scale image that are determined not to be a region containing graphics in step (d), to generate a plurality of binarized images of the candidate regions; (f) for each binarized image of a candidate region, analyzing its geometric characteristics and/or statistics of connected components within it to determine whether the corresponding candidate region of the input image is a region containing graphics or a region containing text and/or tables; and (g) for each candidate region of the input image that is determined not to be a region containing graphics in step (e) and step (f) or is determined to be a region containing text and/or tables in step (f), removing a background in the region by setting pixels of the input image which are located in areas corresponding to white areas of the corresponding binarized image generated in step (e) to the pixel value representing the ideal background, without altering any other regions of the input image.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

The background removal method described in detail below applies to gray-scale input images. Color images can be converted to gray-scale image using a standard method before applying this background removal method. Alternatively, each individual color channel of a color image can be treated as a gray-scale image, and the background removal method can be applied to one color channel only or to multiple color channels separately. In the latter case, the results of multiple color channels can be selected or combined.

For simplicity of this disclosure, it is assumed that ideal background is white, and that the background that is to be removed is non-white, while the foreground texts are darker than the background (gray or black). In addition, it is also assumed that the size of non-white background is much larger than any individual text characters in the foreground. The background removal method can also be applied to document images whose ideal background is black or gray; those skilled in the relevant art will be able to make appropriate adaptations accordingly without undue experimentation.

The goal of the background removal method according to embodiments of the present invention is to remove background in text and table areas of a document image, i.e., setting the background to the ideal background color (e.g. white), without changing the foreground (the text, table lines) and without affecting the graphical areas of the document image. Graphical areas refer to areas that have non-text content such as photographs or other graphics; they should not be treated with background removal. Table areas generally contain text as well as long, typically straight lines; non-white background in tables is to be removed by this method.

The background removal method described herein is effective when the contrast between the foreground and the background is sufficiently high, and when the background is relatively uniform or slow-varying. Although it may not be very effective for complex, fast-changing background patterns, an advantage of this method is its speed and relative simplicity.

The background removal method according to embodiments of the present invention includes three stages: first, large regions that potentially contain non-white background are identified as candidate areas; of those candidate regions, graphical regions are identified, and excluded from the background removal processing, and text and table regions are identified for further processing; for each candidate region that is a text or table region, a relatively simple method is used to set the background pixels to white.

Figure 1:
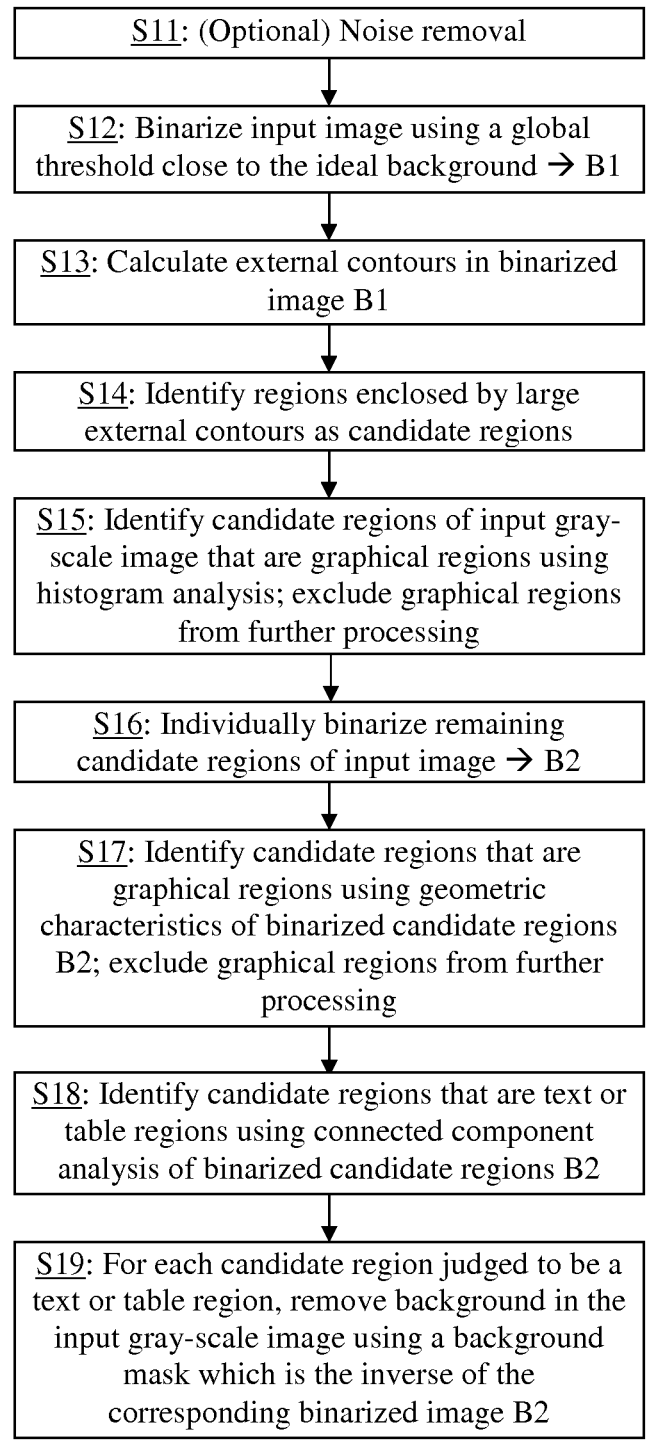
FIG. 1 schematically illustrates a background removal method according to an embodiment of the present invention.
Figure 2:
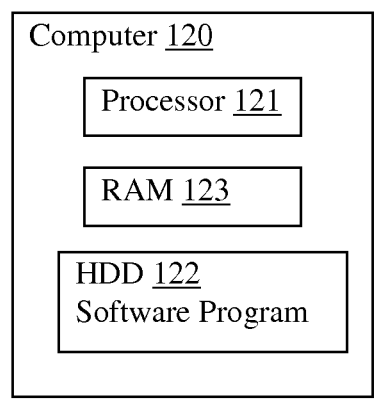
FIG. 2 schematically illustrates a data processing apparatus in which embodiments of the present invention may be implemented.

FIG. 1 schematically illustrates a background removal method according to an embodiment of the present invention. The input image for the process is a gray-scale image. It may be, for example, an image generated by scanning a hard copy document.

As an initial step (optional), noise removal is applied to the input image (step S11). Any suitable de-noising method may be used. An edge-preserving de-noising method is preferred.

To identify regions of the input image that potentially contains non-white background, the input image is first binarized using a global threshold that is very close to the value of the ideal background (white) (step S12). The binarized image is denoted B1. As a result, any area with non-white background will become a black area in the binarized image B1. Graphical areas will typically also become black areas in B1. A contour analysis is performed on the binarized image B1 to calculate external contours of black areas in the image (step S13); large external contours are identified, and regions of the input gray-scale image enclosed by these large external contours are designated as candidate regions that potentially contain text over non-white background (step S14). In B1, text on white background will produce small black areas corresponding to individual characters; therefore, a suitable contour size threshold is used in step S14 to identify large contours. Note that a table that has borders on all sides will produce an external contour that encloses the entire table; therefore such a table will be identified as a candidate region even if it has a white background.

For each candidate region in the input gray-scale image, a histogram analysis is performed for a preliminary determination of the nature of that region (step S15). The histogram analysis calculates a histogram of the numbers of pixels having each pixel value. If the histogram has one high and relatively narrow peak near a pixel value that corresponds to the black color of text (e.g., between 220 and 240 where 255 is pure black), another high peak near a value that correspond to white (e.g. below 20), and relatively small numbers of pixels at other pixel values, then the candidate region is likely to contain black text or table on white background (for example, a table having borders on all sides, with text on white background). If the histogram has one high and relatively narrow peak near the pixel value that corresponds to the black color of text, and also relatively large numbers of pixels with other pixel values between black and white, then the region is likely to contain black text on non-white background. If the histogram has no significant peak near the value that corresponds to black, and a broad distribution of pixels at all pixel values, then the region is likely to be a graphical region, e.g. a photograph. Regions that are judged to be graphical region are deemed not candidate regions and excluded from further background removal processing (step S15).

The remaining candidate regions of the input image are individually binarized in a second binarization step (step S16). Any suitable binarization method may be used, which can use either global or local/adaptive thresholding. Preferably, a computationally simple binarization algorithm is used. These individual binarized regions are denoted B2.

Unlike the first binarization step S12, the second binarization step S16 uses proper thresholds so that in the binarized regions B2, the text and lines become black while the background (including non-white background) becomes white.

For each binarized candidate region B2, its geometric characteristics such as shape, fill rate (the percentage of black pixels), existence of many long lines, etc. are analyzed to identify whether the region is a graphical region or a text or table region (step S17). For example, the fill rate of binarized photos tend to be higher than that of typical text and table regions. Binarized photos also tend to have relatively large black areas with irregular shapes, while tables tend to have black borders with rectangular shapes. The existence of long, straight lines indicates tables. The criteria used in this identification step can be obtained empirically using typical samples. Regions that are judged to graphical region are deemed not candidate regions and excluded from further background removal processing (step S17).

If the judgment in step S17 still cannot determine whether some regions are graphical or text/table, a more detailed connected component analysis is carried out for the binarized candidate regions B2 to accomplish that determination (step S18). In binary images, a connected component is a shape formed of black pixels connected to each other. In step S18, connected components that are very large or very small are removed (the criteria for removal can be obtained empirically by studying typical samples), and statistics of connected components are then calculated, for example: the average/variance/median/maximum/minimum of height, width, aspect ratio, orientation angle, number of holes, stroke width, etc. For binarized text, the connected components typically correspond to text characters or parts thereof, and have characteristic statistical distributions of height, width, aspect ratio, orientation angle, number of holes, stroke width, etc. Graphical regions, on the other hand, do not have the same statistical distributions of text connected components. These statistics and associated heuristic rules can be used to determine whether a candidate region is a text/table region or a graphical region.

The heuristic rules can be derived based on a set of representative document image samples. In one example, the following heuristic rules are used, and a region is judged to be text or table region if the connected component statistics satisfy: (1) the height and width variances are no more than 2 times the height and width averages, respectively; (2) the aspect ratio average is between 0.6 and 1.5; (3) the number of holes in each connected component is no more than 3 (this rule only applies for Western languages and is not valid for East Asian languages); and (4) the stroke width variance is no more than 3 times the stroke width average.

Steps S12 to S18 accomplish the goal of distinguishing graphical regions vs. text and table regions of the document image.

Then, for each candidate region that has been judged to be a text or table region, that region of the input gray-scale image is processed for background removal (step S19). More specifically, for each such region, a background mask is created, which is the inverse of the binary image B2 for that region outputted by the second binarization step S16. The pixels of the input image located in the in the background mask are set to ideal white. This removes any non-white background in these regions of the input image. For candidate regions that are judged to be graphical regions, no background removal is done. An output gray-scale image is generated by step S19.

Thus, it can be seen that the background removal method described here does not affect pixel values in foreground texts and graphical regions of the original input image.

The output gray-scale image can be subject to further processing as desired, such as printing, binarization, OCR (optical character recognition), etc.

The background removal methods described here can be implemented in a data processing system such as a computer 120 as shown in FIG. 4. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods. In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the methods for background removal for document image and related apparatus of the present invention without departing from the spirit or scope of the invention. Thus, it is intended that the present invention cover modifications and variations that come within the scope of the appended claims and their equivalents.

What is claimed is:

1. A method for processing an input gray-scale document image for background removal, comprising:
    (a) binarizing the input gray-scale image using a global threshold value close to a pixel value representing an ideal background to generate a first binarized image;
    (b) calculating external contours in the first binarized image;
    (c) identifying large external contours, and designating regions of the input gray-scale image enclosed by large external contours as candidate regions for background removal;
    (d) for each candidate region of the input gray-scale image, calculating a histogram of numbers of pixels having each pixel value, and based on the histogram, determining whether the candidate region is a region containing graphics;
    (e) individually binarizing candidate regions of the input gray-scale image that are determined not to be a region containing graphics in step (d), to generate a plurality of binarized images of the candidate regions;
    (f) for each binarized image of a candidate region, analyzing its geometric characteristics and/or statistics of connected components within it to determine whether the corresponding candidate region of the input image is a region containing graphics or a region containing text and/or tables; and
    (g) for each candidate region of the input image that is determined not to be a region containing graphics in step (e) and step (f) or is determined to be a region containing text and/or tables in step (f), removing a background in the region by setting pixels of the input image which are located in areas corresponding to white areas of the corresponding binarized image generated in step (e) to the pixel value representing the ideal background, without altering any other regions of the input image.

2. The method of claim 1, wherein in step (d), if the histogram has no significant peak near pixel values that correspond to black, and has a broad distribution of pixels at all pixel values, the region determined to be a region containing graphics.

3. The method of claim 1, wherein in step (f), the geometric characteristics of a binarized image include its shape, fill rate, and existence of long lines, and wherein if the fill rate is higher than a predetermined threshold, the corresponding candidate region is determined to be a region containing graphics.

4. The method of claim 1, wherein in step (f), the statistics of connected components within a binarized image include one or more statistical values selected form a group consisting of average, variance, median, maximum, and minimum, of one or more measures of the connected components selected from a group consisting of height, width, aspect ratio, orientation angle, number of holes, and stroke width.

5. The method of claim 4, wherein in step (f), a candidate region is determined to contain text and/or table if the statistics of connected components satisfy the following: (1) height and width variances are no more than 2 times height and width averages, respectively; (2) an aspect ratio average is between 0.6 and 1.5; (3) a number of holes in each connected component is no more than 3; and (4) a stroke width variance is no more than 3 times a stroke width average.

6. A computer program product comprising a computer usable non-transitory medium having a computer readable program code embedded therein for controlling a data processing apparatus, the computer readable program code configured to cause the data processing apparatus to execute a process for removing background in an input gray-scale document image, the process comprising:
    (a) binarizing the input gray-scale image using a global threshold value close to a pixel value representing an ideal background to generate a first binarized image;
    (b) calculating external contours in the first binarized image;
    (c) identifying large external contours, and designating regions of the input gray-scale image enclosed by large external contours as candidate regions for background removal;
    (d) for each candidate region of the input gray-scale image, calculating a histogram of numbers of pixels having each pixel value, and based on the histogram, determining whether the candidate region is a region containing graphics;
    (e) individually binarizing candidate regions of the input gray-scale image that are determined not to be a region containing graphics in step (d), to generate a plurality of binarized images of the candidate regions;
    (f) for each binarized image of a candidate region, analyzing its geometric characteristics and/or statistics of connected components within it to determine whether the corresponding candidate region of the input image is a region containing graphics or a region containing text and/or tables; and
    (g) for each candidate region of the input image that is determined not to be a region containing graphics in step (e) and step (f) or is determined to be a region containing text and/or tables in step (f), removing a background in the region by setting pixels of the input image which are located in areas corresponding to white areas of the corresponding binarized image generated in step (e) to the pixel value representing the ideal background, without altering any other regions of the input image.

7. The computer program product of claim 6, wherein in step (d), if the histogram has no significant peak near pixel values that correspond to black, and has a broad distribution of pixels at all pixel values, the region determined to be a region containing graphics.

8. The computer program product of claim 6, wherein in step (f), the geometric characteristics of a binarized image include its shape, fill rate, and existence of long lines, and wherein if the fill rate is higher than a predetermined threshold, the corresponding candidate region is determined to be a region containing graphics.

9. The computer program product of claim 6, wherein in step (f), the statistics of connected components within a binarized image include one or more statistical values selected form a group consisting of average, variance, median, maximum, and minimum, of one or more measures of the connected components selected from a group consisting of height, width, aspect ratio, orientation angle, number of holes, and stroke width.

10. The computer program product of claim 9, wherein in step (f), a candidate region is determined to contain text and/or table if the statistics of connected components satisfy the following: (1) height and width variances are no more than 2 times height and width averages, respectively; (2) an aspect ratio average is between 0.6 and 1.5; (3) a number of holes in each connected component is no more than 3; and (4) a stroke width variance is no more than 3 times a stroke width average.

* * * * *